United States Patent
Kamiya et al.

(10) Patent No.: US 7,967,495 B2
(45) Date of Patent: Jun. 28, 2011

(54) SCUFF PLATE

(75) Inventors: Takayuki Kamiya, Aichi-ken (JP); Yasuyuki Higuchi, Aichi-ken (JP); Kazuo Takeda, Aichi-ken (JP); Chiharu Totani, Aichi-ken (JP); Tatsuya Oba, Aichi-ken (JP); Shuji Inui, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 113 days.

(21) Appl. No.: 12/003,097

(22) Filed: Dec. 20, 2007

(65) Prior Publication Data

US 2008/0170405 A1 Jul. 17, 2008

(30) Foreign Application Priority Data

Jan. 17, 2007 (JP) ................................ 2007-008403
Aug. 10, 2007 (JP) ................................ 2007-210513

(51) Int. Cl.
*F21V 7/04* (2006.01)

(52) U.S. Cl. ........ 362/630; 362/632; 362/633; 362/623; 362/625

(58) Field of Classification Search .................. 362/495, 362/501, 615, 623–625, 97.1–97.4, 630, 362/632–634, 631, 602; 349/62–63, 65

See application file for complete search history.

(56) References Cited

U.S. PATENT DOCUMENTS

| 5,584,556 | A | * | 12/1996 | Yokoyama et al. | 362/625 |
| 5,641,221 | A | * | 6/1997 | Schindele et al. | 362/501 |
| 6,339,418 | B1 | | 1/2002 | Kitagawa | |
| 6,419,306 | B2 | * | 7/2002 | Sano et al. | 296/209 |
| 6,831,714 | B2 | * | 12/2004 | Masaki et al. | 349/112 |
| 6,889,456 | B2 | * | 5/2005 | Shibata et al. | 40/546 |
| 6,971,758 | B2 | * | 12/2005 | Inui et al. | 362/602 |
| 7,178,967 | B2 | * | 2/2007 | Kim | 362/633 |
| 2002/0131261 | A1 | | 9/2002 | Inui et al. | |
| 2005/0213351 | A1 | * | 9/2005 | Yang | 362/633 |
| 2007/0058359 | A1 | * | 3/2007 | Saitoh et al. | 362/97 |
| 2008/0266905 | A1 | * | 10/2008 | Yeh | 362/630 |

FOREIGN PATENT DOCUMENTS

| JP | H10-282911 A | 10/1998 |
| JP | A-2002-096680 | 4/2002 |
| JP | A-2002-108257 | 4/2002 |

OTHER PUBLICATIONS

Notification of the First Office Action mailed on Oct. 16, 2009 issued from the Chinese State Intellectual Property Office in the corresponding Chinese patent application No. 200810001125.0 (with English translation).

* cited by examiner

*Primary Examiner* — Robert J May

(74) *Attorney, Agent, or Firm* — Posz Law Group, PLC

(57) ABSTRACT

Luminous surfaces 25 of a concave-convex shape are formed on a light guide member 2 of a scuff plate, and a screen member 4 made of a non-transparent material is disposed between the light guide member 2 and a wire harness 31 of the scuff plate. The light guide member 2 luminously displays a design in a three-dimensional manner, and also the wire harness 31 will not be visually recognized through the light guide member 2, and therefore the design is enhanced.

16 Claims, 9 Drawing Sheets

SCUFF PLATE

BACKGROUND OF THE INVENTION

1. Field of the Invention

This invention relates to a scuff plate for a vehicle.

2. Description of the Related Art

A scuff plate is a member for protecting an edge portion (side sill) of a door opening formed in a vehicle. In recent years, there have been proposed scuff plates which luminously display a design such as characters (see, for example, Patent Literatures 1 and 2)

A scuff plate disclosed in Patent Literature 1 comprises a light guide member made of a transparent material, a light source, and a metal plate placed on an upper surface of the light guide member and including light transmission holes having respective predetermined shapes. In this scuff plate, light emitted from the light source enters the light guide member, and then goes to the exterior through the light transmission holes. Therefore, a design corresponding to the shapes of the light transmission holes is displaced on the scuff plate in a luminous manner. However, in the scuff plate disclosed in Patent Literature 1, the design corresponding to the shapes of the light transmission holes is displayed in a luminous manner, and therefore the design could not be displaced in a three-dimensional manner.

A scuff plate disclosed in Patent Literature 2 is not provided with the above-mentioned metal plate, and instead concave-convex character portions (luminous surfaces) are formed on a light guide member. Therefore, this scuff plate can display a design corresponding to the concave-convex shape in a three-dimensional manner, and therefore is excellent in design. Incidentally, for example, in the case where the distance between a power source (for supplying electric power to a light source) and the light source is large, wiring (so-called wire harness) for electrically connecting the power source to the light source is often installed in a region where the light guide member is disposed. In the scuff plate disclosed in Patent Literature 2, a groove portion is formed in the light guide member, and the wire harness electrically connecting the power source to the light source is received in this groove portion. However, the light guide member is made of a transparent material, and therefore there is a possibility that the wire harness is visually recognized through the light guide member.

Generally, the light guide member and the light source are housed or received in a box-like case. Therefore, in case the wire harness is installed along the outside of this case, it is thought that the wire harness will not be visually recognized through the light guide member. The scuff plate is provided at the boundary between the interior and exterior of a passenger compartment of the vehicle, and therefore can often be exposed to rain water. Therefore, the interior of the case need to be sealed watertight from the exterior. However, for example, in the case where a plurality of light sources are provided, and the wire harness is installed along the outside of the case, wire harness lead-out ports corresponding in number to the light sources need to be provided in the case, and also each of these lead-out ports need to be sealed watertight. Therefore, in this case, the process of producing the scuff plate becomes complicated, and the cost of the scuff plate increases. Therefore, the conventional scuff plates have a problem that the excellent design and the reduced production cost are not compatible.

Patent Literature 1: JP-A-2002-A-96680
Patent Literature 2: JP-A-2002-108257

SUMMARY OF THE INVENTION

This invention has been made in view of the above circumstances, and an object of the invention is to provide a scuff plate which is excellent in design, and can be produced at a low cost.

The above object has been achieved by a scuff plate of the present invention characterized in that the scuff plate comprises a box-like case; a light guide member which is made of a transparent material, and has a luminous surface of a concave-convex shape, and is received within the case; a light source for applying light to the light guide member; a screen member which is made of a non-transparent material, and is disposed between the light guide member and a bottom wall of the case; and a wire harness for electrically connecting the light source to a power source, at least part of the wire harness being disposed between the screen member and the bottom wall of the case.

Preferably, the scuff plate of the invention has at least one of the following features (1) to (7).

(1) The screen member is made of metal.

(2) The scuff plate further comprises a protective member made of a transparent material and covering an obverse surface of the light guide member, and at least part of the obverse surface of the light guide member is spaced from a reverse surface of the protective member.

(3) An inward portion of the obverse surface of the light guide member disposed inwardly of an outer peripheral portion thereof is depressed with respect to the outer peripheral portion such that the obverse surface assumes a picture frame-like shape, and the protective member is held against the outer peripheral portion of the obverse surface of the light guide member.

(4) The light guide member has a luminous recess of a depression-shape, and at least part of the luminous surface is defined by an inner surface of the luminous recess, and a plurality of first concave portions of a depression-shape and a plurality of second concave portions of a depression-shape which are smaller in maximum depression height than the first concave portions are formed in a distributed manner on the inner surface of the luminous recess such that the inner surface of the luminous recess has an uneven shape.

(5) The light guide member has a luminous recess of a depression-shape, and at least part of the luminous surface is defined by an inner surface of the luminous recess, and a plurality of first concave portions of a depression-shape and a plurality of second concave portions of a depression-shape which are smaller in maximum depression height than the first concave portions are formed in a distributed manner on those portions of a side surface of the light guide member other than that portion thereof facing the light source such that the portions of the side surface other than the portion thereof facing the light source has an uneven shape.

(6) That portion of the inner surface of the luminous recess disposed closer to the light source is inclined at an angle of not smaller than 25° relative to a bottom surface of the light guide member.

(7) There is provided a filter made of a colored material which can transmit light emitted from the light source, and the light source applies light to a side surface of the light guide member, and a portion of the filter serving as a light-transmitting portion is disposed between the light source and the side surface of the light guide member, and the other portion of the filter serving as a fixing portion extends in a direction intersecting the light-transmitting portion, and is held between the screen member and the bottom wall of the case.

In the scuff plate of the invention, the luminous surface of the concave-convex shape is formed on the light guide member made of the transparent material. Therefore, when light emitted from the light source enters the light guide member, the luminous surface shines (that is, becomes luminous). Therefore, the light guide member displays a design, corresponding to the shape of the luminous surface, in a three-dimensional manner. Furthermore, the screen member made of the non-transparent material is interposed between the light guide member and the wire harness. Therefore, the wire harness is covered with the screen member, and will not be visually recognized through the light guide member. Therefore, the scuff plate of the invention is excellent in design. Furthermore, the wire harness is received within the case, and therefore the number of wire harness lead-out ports can be reduced. Therefore, the scuff plate of the invention can be produced at a low cost.

In the case where the screen member made of metal is used, metallic luster resulting from the screen member can be visually recognized through the light guide member. Therefore, the scuff plate of the invention having the above feature (1) is more excellent in design.

The scuff plate of the invention having at least one of the above features (2) and (3) is excellent in rigidity to suppress damage of the light guide member, and also is excellent in design.

The scuff plate of the invention having the above feature (4) can cause the luminous recess to shine uniformly and bright, and therefore is excellent in design.

The scuff plate of the invention having the above feature (5) can suppress an uneven shining developing on the side surface of the light guide member, and therefore is excellent in design.

The scuff plate of the invention having the above feature (6) can cause the luminous recess to shine bright while suppressing an uneven shining developing on the side surface of the light guide member, and therefore is excellent in design.

The scuff plate of the invention having the above feature (7) can cause the light guide member to shine in a desired color, and therefore is excellent in design, and besides this scuff plate can be produced at a low cost.

DESCRIPTION OF THE PREFERRED EMBODIMENTS

Figure 1:
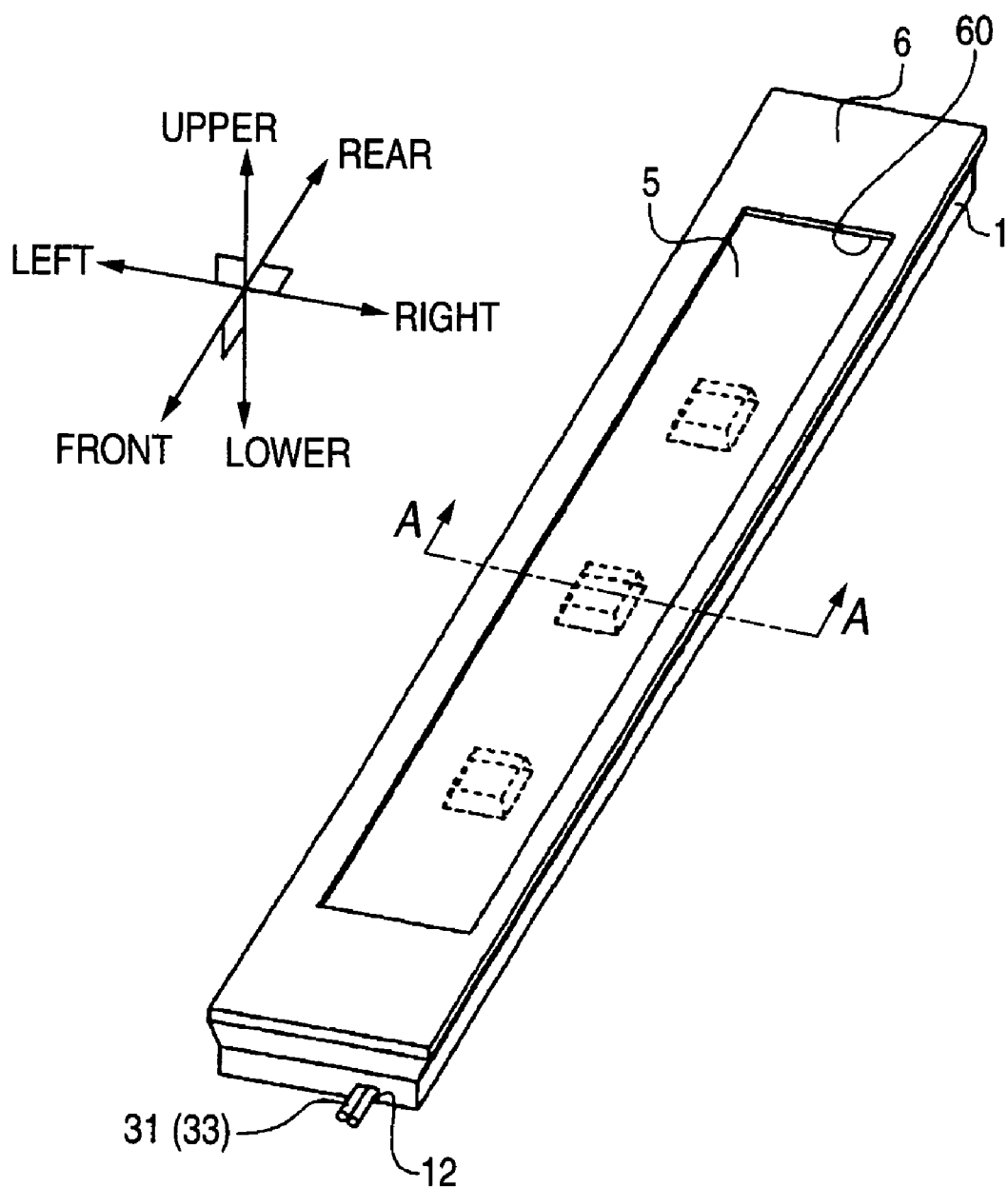
FIG. 1 is a perspective view schematically showing a preferred embodiment of a scuff plate of the present invention.

A commonly-used light source such as an LED, a tungsten lamp, etc., can be used as the light source of the scuff plate of the invention. The number of the light source(s) may be one or may be more than one. In the case where the scuff plate has a rectangular shape so as to extend along a side sill, it is preferred to provide two light sources respectively at opposite end portions of the scuff plate spaced from each other in the longitudinal direction thereof. In this case, the light guide member can be shined uniformly in the longitudinal direction.

An ordinary transparent material commonly used for a light guide member, such as a polycarbonate resin, an acrylic resin, an epoxy resin, glass, etc., can be used as the material for the light guide member.

The luminous surface need to have such a concave-convex shape as to display the design in a three-dimensional manner. The whole luminous surface may be formed in a recess manner in the light guide member, or part of the luminous surface may be exposed to the outside of the light guide member. Incidentally, in the present invention, the term "concave-convex shape" means that it may have at least one of a concave shape and a convex shape, and is not always limited to a shape having both of a concave shape and a convex shape.

The screen member should be made of a non-transparent material, and any suitable material such as a resin, metal, wood, a cloth, etc., can be used. Incidentally, the screen member is visually recognized through the light guide member, and therefore a suitable material for the screen member should be selected according to the desired design. For example, in the case where the screen member made of metal is used, metallic luster resulting from the screen member, together with the three-dimensional design resulting from the light guide member, is displayed, and therefore the excellent design can be imparted to the scuff plate. The screen member may be separate from the light guide member or may be formed integrally with the light guide member. For example, a metallic material may be vapor deposited on the bottom surface of the light guide member to form a metallic layer which serves as the screen member formed integrally with the light guide member.

By the way, the scuff plate is a member for protecting an edge portion of a door opening formed in a vehicle. Therefore, an external force is liable to act on the scuff plate. In the case where the surface (obverse surface facing away from the screen member) of the light guide member is covered with the protective member made of the transparent material, the rigidity of the scuff plate can be increased, and also damage of the light guide member can be prevented. In this case, however, when the protective member and the light guide member are held in intimate contact with each other, the protective member is often deformed, so that a rainbow-like pattern develops thereon, thereby adversely affecting the design of the scuff plate. Therefore, at least part of the light guide member is spaced from the protective member, and by doing so, the intimate contact of the protective member with the light guide surface is suppressed, so that the development of the above-mentioned rainbow-like pattern can be suppressed. In order to further increase the rigidity of the scuff plate and also to more positively prevent damage of the light guide member, a high-strength transparent material such as a polycarbonate resin is preferably used as the material for the protective member. Furthermore, in order to further increase the rigidity of the scuff plate, a high-strength protective member of a rectangular frame-like shape is preferably disposed on the upper surface of the protective member to cover a peripheral edge portion of the light guide member. Preferably, stainless steel, aluminum or the like is used as the material for the high-strength protective member.

In the case where the obverse surface of the light guide member is spaced from the reverse surface of the protective member, the distance between the obverse surface of the light guide member and the reverse surface of the protective member is preferably not smaller than 0.3 mm. Incidentally, in this case, a spacer for spacing the light guide member and the protective member from each other may be provided on other member (such for example as the case) than the light guide member and the protective member. In this case, however, the spacer may often be visually recognized by the user through the protective member and the light guide member, depending on the shape and mounting position of the spacer. When the spacer is visually recognized, the design of the scuff plate is adversely affected. In the case where the inward portion of the obverse surface of the light guide member is depressed with respect to the outer peripheral portion thereof such that this obverse surface assumes the picture frame-like shape, and the protective member is held against this outer peripheral portion, part of the light guide member (that is, the outer peripheral portion of the obverse surface) can serve as a spacer, and the design of the scuff plate can be prevented from being adversely affected.

The light guide member may be so designed as to merely shine upon reception of light from the light source or may be so designed as to luminously display a predetermined design in a three-dimensional manner. For example, a portion (luminous recess) of a depression-shape is formed in the light guide member, and at least part of the luminous surface is defined by the inner surface (hereinafter referred to as "luminous concave surface") of the luminous recess, and by doing so, the light guide member luminously displays the design, corresponding to the shape of the luminous recess, in a three-dimensional manner. In this case, by forming the luminous concave surface into an uneven shape, this luminous concave surface can be shined uniformly. The luminous concave surface can be formed into such an uneven shape by forming a plurality of concave portions of a depression-shape on this luminous concave surface. Incidentally, the luminous concave surface can be shined more uniformly by decreasing a maximum depression height of the concave portions. In this case, however, light-receiving portions (i.e., those portions for receiving light emitted from the light source) on the luminous concave surface are decreased in size, and therefore the luminous concave surface looks darkly shining. In contract, when the maximum depression height of the concave portions is increased, the light-receiving portions are increased in size, so that the luminous concave portion looks brightly shining. In this case, however, the difference in brightness between the concave portions and the other portions becomes large, so that an even shining develops on the luminous recess. Therefore, the concave portions are formed by first concave portions and second concave portions which are smaller in maximum depression height than the first concave portions, and the plurality of first concave portions and the plurality of second concave portions are arranged in a distributed manner, and by doing so, the luminous concave surface can be shined bright by the first concave portions, and also the luminous concave surface can be shined uniformly by the second concave portions. Incidentally, the first concave portions may have the same maximum depression height or may have different maximum depression heights. Similarly, the second concave portions may have the same maximum depression height or may have different maximum depression heights.

In the case where the luminous recess is formed in the light guide member, the design displayed by the luminous recess is imaged on those portions (hereinafter referred to as "luminous side surfaces") of the side (peripheral) surface of the light guide member other than that portion thereof facing the light source, and as a result the design of the scuff plate is often adversely affected. By forming the luminous side surfaces into an uneven shape as described above for the luminous concave surface, this imaging effect can be relieved, and therefore the design of the scuff plate is enhanced. Furthermore, by forming first concave portions and second concave portions in a distributed manner on the luminous side surfaces (as described above for the luminous concave surface) such that the luminous side surfaces have the uneven shape, the luminous side surfaces can be shined uniformly, and also with respect to light emitted from the light source and then reaching the luminous side surfaces, those components reflected toward the inside of the light guide member are increased, and therefore a light loss can be reduced. Furthermore, in this case, when that portion of the luminous concave surface disposed closer to the light source is inclined at an angle of not smaller than 25° relative to the bottom surface of the light guide member, the light-receiving portions on the luminous concave surface are increased in size. Therefore, this can compensate for a light loss caused by the luminous side surfaces, and the luminous concave surface can be shined bright.

When the filter made of the colored material which can transmit light emitted from the light source is provided between the light source and the light guide member, light emitted from the light source and then entering the light guide member can be colored by the filter. In this case, the light guide member can be shined in a color corresponding to the color of the filter, and the design of the scuff plate can be further enhanced. In order to reduce a light loss, it is preferred that the filter have a small thickness. On the other hand, the thin filter is inferior in handleability, and therefore the efficiency of the production of the scuff plate with the thin filter is often low.

By extending a portion (fixing portion) of the filter in a direction intersecting the other portion (light-transmitting portion) of the filter, the strength of the filter can be increased. This is because the strength of the boundary portion between the fixing portion and the light-transmitting portion of the filter of this configuration is increased. When the strength of the filter is increased, the handleability of the filter is enhanced, and therefore the efficiency of the production of the scuff plate is enhanced.

Furthermore, the light source is opposed to the side surface of the light guide member (so that the light source can apply light to the side surface of the light guide member), and the light-transmitting portion of the filter is disposed between the light source and the side surface of the light guide member, and the fixing portion of the filter is held between the screen member and the bottom wall of the case. With this arrangement, the filter can be easily located in its mounting position. This also enhances the efficiency of the production of the scuff plate.

Scuff plates of the present invention will now be described with reference to the drawings.

First Embodiment

Figure 2:
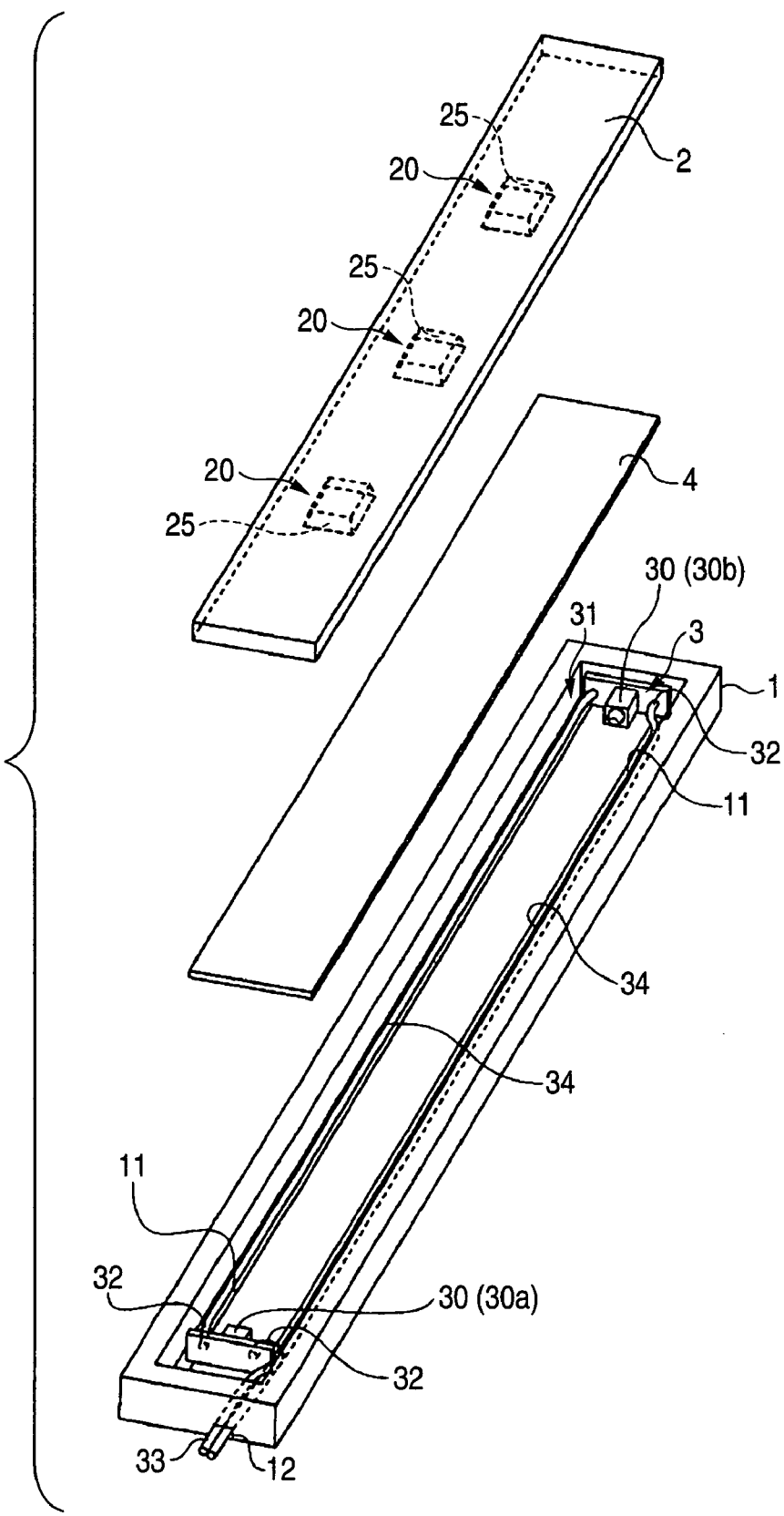
FIG. 2 is an exploded perspective view schematically showing a case, a light guide member and a light source unit of the scuff plate of the embodiment.
Figure 3:
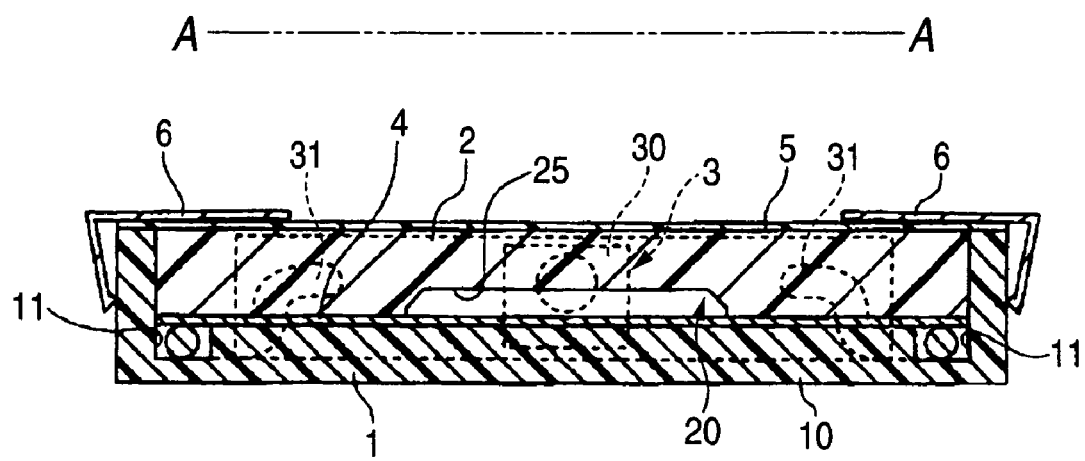
FIG. 3 is a schematic cross-sectional view of the scuff plate of the embodiment taken along the line A-A of FIG. 1.

A scuff plate of a first embodiment has the above feature (1). FIG. 1 is a perspective view schematically showing the scuff plate of the first embodiment. FIG. 2 is an exploded perspective view schematically showing a case, a light guide member and a light source unit of the scuff plate of the first embodiment. FIG. 3 is a schematic cross-sectional view of the scuff plate of the first embodiment taken along the line A-A of FIG. 1. In the following description of the first embodiment, the upper, lower, left, right, front and rear sides correspond respectively to the upper, lower, left, right, front and rear sides in FIG. 1.

The scuff plate of the first embodiment comprises the case 1, the light guide member 2, the light source unit 3, a screen member 4, a protective member 5, and a high-strength protective member 6.

The case 1 is made of a resin, and has an elongated box-like shape with an open top. As shown in FIGS. 2 and 3, two groove portions 11 each in the form of a recess are formed respectively in opposite (right and left) side edge portions of a bottom wall 10 of the case 1, and extend in a forward-rearward direction. As shown in FIGS. 1 and 2, a lead-out port 12 is formed in the case 1, and the interior and exterior of the case 1 communicate with each other through this lead-out port 12.

The screen member 4 is made of metal (aluminum), and has a rectangular plate-shape. A length of the screen member 4 in the forward-rearward direction is slightly smaller than a length of the case 1 in the forward-rearward direction. A length of the screen member 4 in a right-left direction is substantially equal to a length (inner size) of the case 1 in the right-left direction. The screen member 4 is superposed on the bottom wall 10 of the case 1 to cover the upper sides of the groove portions 11.

The light guide member 2 is made of a transparent material, that is, an acrylic resin, and has a generally rectangular plate-shape. A length of the light guide member 2 in the forward-rearward direction is substantially equal to the length of the screen member 4 in the forward-rearward direction. A length of the light guide member 2 in the right-left direction is substantially equal to the length of the screen member 4 in the right-left direction. Luminous surfaces of a concave-convex shape are formed at the light guide member 2. More specifically, luminous recesses 20 each having a depression-shape are formed in the light guide member 2. Each luminous recess 20 is open to a lower surface of the light guide member 2, and extends into the inside of the light guide member 2, and has a generally channel-shaped cross-section. An inner surface (i.e., a luminous concave surface) of this luminous recess 20 serves as the luminous surface 25 in the scuff plate of the first embodiment. The light guide member 2 is superposed on the screen member 4.

The light source unit 3 comprises two light sources 30, and a wire harness 31 electrically connecting the two light sources 30 to a power source (not shown). Each light source 30 comprises an LED, and a board. The wire harness 31 includes portions (harness proximal portions 32) adjacent to the light sources 30, portions (harness end portions 33) adjacent to the power source, and portions (harness main portions 34) between the harness proximal portions 32 and the harness end portions 33. The harness proximal portions 33 and the harness main portions 34, together with the light sources 30, are received in the case 1. More specifically, one light source 30a is disposed at the front side of a front surface of the light guide member 2, while the other light source 30b is disposed at the rear side of a rear surface of the light guide member 2. The harness main portions 34 are received in the groove portions 11. The harness proximal portions 32, together with the light sources 30, are disposed outside of (above) the groove portions 11. The harness end portions 33 extend to the exterior of the case 1 through the lead-out port 12. Therefore, the harness main portions 34 are disposed under the screen member 4, and are covered with peripheral walls of the groove portions 11 and the screen member 4.

The protective member 5 is made of a transparent resin, that is, a polycarbonate resin, and has a rectangular plate-shape. A length of the protective member 5 in the forward-rearward direction is substantially equal to the length (outer size) of the case 1 in the forward-rearward direction. A length of the protective member 5 in the right-left direction is substantially equal to a length (outer size) of the case 1 in the right-left direction. The protective member 5 is superposed on the light guide member 2 to cover the obverse (upper) surface of the light guide member 2.

The high-strength protective member 6 is made of stainless steel, and has a rectangular plate-shape. A window portion 60 of a rectangular shape is formed through a generally central portion of the high-strength protective member 6. The high-strength protective member 6 is superposed on the protective member 5. A length of the high-strength protective member 6 in the forward-rearward direction is equal to the length (outer size) of the case 1 in the forward-rearward direction. A length of the high-strength protective member 6 in the right-left direction is equal to the length (outer size) of the case 1 in the right-left direction. A length of the window portion 60 in the forward-rearward direction is smaller than the length of the light guide member 2 in the forward-rearward direction. A length of the window portion 60 in the right-left direction is smaller than the length of the light guide member 2 in the right-left direction. Therefore, the high-strength protective member 6 covers a peripheral edge portion of the protective member 5 and a peripheral edge portion of the light guide member 2 from the upper side. The light guide member 2 can be visually recognized through the window 60 from the upper side of the high-strength protective member 6.

In the scuff plate of the first embodiment, the luminous surfaces 25 are formed at the light guide member 2. Each luminous surface 25 is defined by the inner surface of the luminous recess 20 of a channel-shaped cross-section, and has a depression-shape. Therefore, when light emitted from the light sources 30 and entering the light guide member 2 is reflected diffusely (irregularly) by the luminous surfaces 25, a design corresponding to the shapes of the luminous surfaces 25 is displayed on the light guide member 2 in a three-dimensional manner. Thus, the scuff plate of the first embodiment can display the design in a three-dimensional manner, and therefore is excellent in design.

In the scuff plate of the first embodiment, part (the harness proximal portions 32 and the harness main portions 34) of the wire harness 31 is received in the case 1. Therefore, in the scuff plate of the first embodiment, only one lead-out port 12 need to be provided despite the fact that the plurality of light sources are provided. Therefore, the scuff plate of the first embodiment can be produced at a low cost.

In the scuff plate of the first embodiment, the metallic screen member 4 is disposed between the light guide member 3 and the wire harness 31 (the harness main portions 34).

Therefore, the harness main portions 34 will not be visually recognized through the light guide member 2, and the design of the scuff plate will not be adversely affected. Furthermore, in the scuff plate of the first embodiment, the harness main portions 34 are received in the respective groove portions 11 formed in the case 1. Therefore, in the scuff plate of the first embodiment, the positioning of the wire harness 31 can be effected by the groove portions 11. By thus positioning the wire harness 31, the efficiency of an operation for assembling the scuff plate is enhanced, and the production cost of the scuff plate can be reduced.

In the scuff plate of the first embodiment, only the harness main portions 34 are received in the groove portions 11, and the light sources 30 and the harness proximal portions 32 are disposed outside of the groove portions 11. However, the light sources 30 and the harness proximal portions 32 may be received, together with the harness main portions 34, in the groove portions 11. In this case, the efficiency of the assembling operation of the scuff plate is further enhanced. Furthermore, the harness main portions 34 and the harness proximal portions 32 may be disposed under the screen member 4 by changing the shape of the light sources 30 and the shape of the screen member 4. Furthermore, terminals for electrical connection to the power source may be provided at the case 1. In this case, there is achieved an advantage that it is not necessary to provide the lead-out port 12 for the wire harness 31. In this case, the whole of the wire harness 31 may be received in the groove portions 11 so as to be covered with the screen member 4.

In the scuff plate of the invention, the groove portions 11 may not be provided in the case 1. In the case where the groove portions 11 for receiving the wire harness 31 are not provided, the efficiency of the assembling operation of the scuff plate is lower as compared with the case where the groove portions 11 are provided. However, even in this case, the harness main portions 34 will not be visually recognized through the light guide member 2, and the design of the scuff plate will not be adversely affected.

In the scuff plate of the first embodiment, the screen member 4 is made of metal, and therefore metallic luster resulting from the screen member 4 can be visually recognized through the light guide member 2. Therefore, the scuff plate of the first embodiment is more excellent in design.

Second Embodiment

Figure 4:
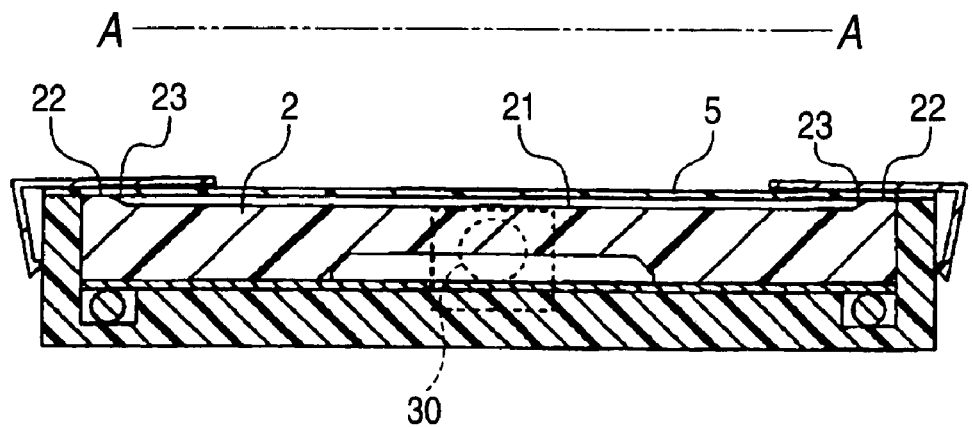
FIG. 4 is a schematic cross-sectional view similar to FIG. 3 but showing a second embodiment of a scuff plate of the invention.

A scuff plate of a second embodiment has the above features (1) to (3). FIG. 4 is a schematic cross-sectional view similar to FIG. 3 but showing the scuff plate of the second embodiment.

The scuff plate of the second embodiment is identical to the scuff plate of the first embodiment except that a light guide member 2 has a different shape. In the scuff plate of the second embodiment, an inward portion 21 of an obverse surface (upper surface in FIG. 4) of the light guide member 2 disposed inwardly of an outer peripheral portion 22 thereof is depressed with respect to the outer peripheral portion 22. Namely, the obverse surface of the light guide member 2 assumes a picture frame-like shape. A boundary portion 23 between the inward portion 21 and the outer peripheral portion 22 has a slanting shape such that a depression height thereof gradually changes.

A protective member 5 is held against the outer peripheral portion 22 of the light guide member 2. Therefore, in the scuff plate of the second embodiment, part (the outer peripheral portion 22) of the light guide member 2 serves as a spacer, and the inward portion 21 of the light guide member 2 is spaced from an inward portion of a reverse surface of the protective member 5. In the scuff plate of the second embodiment, part of the obverse surface of the light guide member 2 is spaced from the reverse surface of the protective member 5, and therefore the development of a rainbow-like pattern on the protective member 5 can be suppressed. Therefore, the scuff plate of the second embodiment is excellent in design.

Furthermore, part of the light guide member 2 is used as the spacer, and therefore the scuff plate of the second embodiment can be produced at a low cost. Furthermore, by thus using part of the light guide member 2 as the spacer, a space between the obverse surface of the light guide member 2 and the reverse surface of the protective member 5 can be minimized. Therefore, the development of a rainbow-like pattern on the protective member 5 is suppressed, and besides there is achieved an advantage that the shaking of the protective member 5 cab be suppressed.

Furthermore, in the scuff plate of the second embodiment, the boundary portion 23 between the inward portion 21 and the outer peripheral portion 22 has the slanting shape. Therefore, when light emitted from light sources 30 reaches this boundary portion 23, the light is refracted, and therefore the light sources 30 are hardly recognized visually through a gap between the light guide member 2 and the protective member 5. In this respect, also, the scuff plate of the second embodiment is excellent in design.

Third Embodiment

Figure 5:
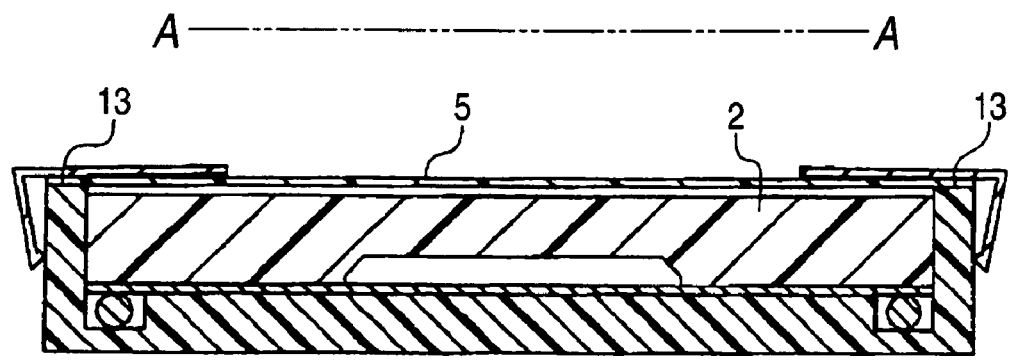
FIG. 5 is a schematic cross-sectional view similar to FIG. 3 but showing a third embodiment of a scuff plate of the invention.

A scuff plate of a third embodiment has the above features (1) and (2). The scuff plate of the third embodiment is identical to the scuff plate of the second embodiment except that a light guide member has a different shape. FIG. 5 is a schematic cross-sectional view similar to FIG. 3 but showing the scuff plate of the third embodiment.

In the scuff plate of the third embodiment, an obverse surface (upper surface) of the light guide member 2 is flat. An upper end (edge) surface 13 of a case 1 projects upwardly from the obverse surface of the light guide member 2. A protective member 5 is held against the upper end surface 13 of the case 1. Therefore, in the scuff plate of the third embodiment, part of the case 1 serves as a spacer, and the whole of the obverse surface of the light guide member 2 is spaced from the reverse surface of the protective member 5. In the scuff plate of the third embodiment, the reverse surface of the protective member 5 is spaced from the obverse surface of the light guide member 2, and therefore the development of a rainbow-like pattern on the protective member 5 can be suppressed. Therefore, the scuff plate of the third embodiment is excellent in design.

Fourth Embodiment

Figure 6:
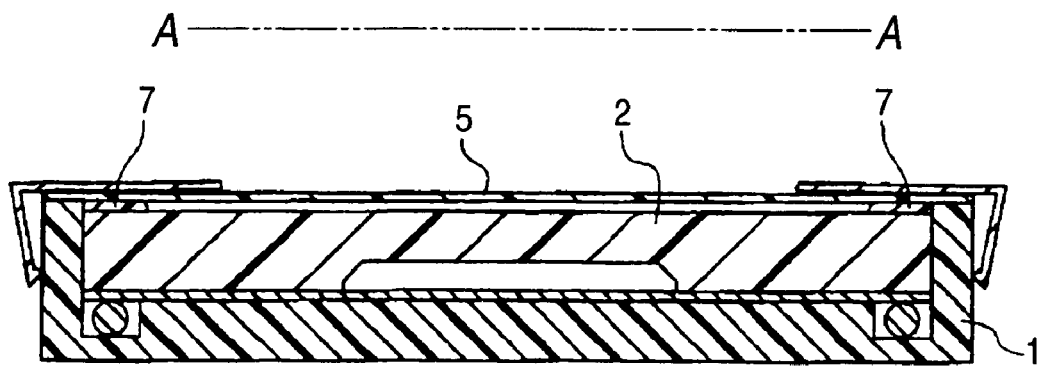
FIG. 6 is a schematic cross-sectional view similar to FIG. 3 but showing a fourth embodiment of a scuff plate of the invention.

A scuff plate of a fourth embodiment has the above features (1) and (2). The scuff plate of the fourth embodiment is identical to the scuff plate of the third embodiment except that a spacer is interposed between an obverse surface of a light guide member and a reverse surface of a protective member. FIG. 6 is a schematic cross-sectional view similar to FIG. 3 but showing the scuff plate of the fourth embodiment.

In the scuff plate of the fourth embodiment, the spacer 7 has a rectangular frame-like shape, and is separate from a case 1, the light guide member 2 and the protective member 5. In the scuff plate of the fourth embodiment, also, the reverse surface of the protective member 5 is spaced from the obverse surface of the light guide member 2, and therefore the development of a rainbow-like pattern on the protective member 5 can be suppressed. Therefore, the scuff plate of the fourth embodiment is excellent in design.

Fifth Embodiment

Figure 7:
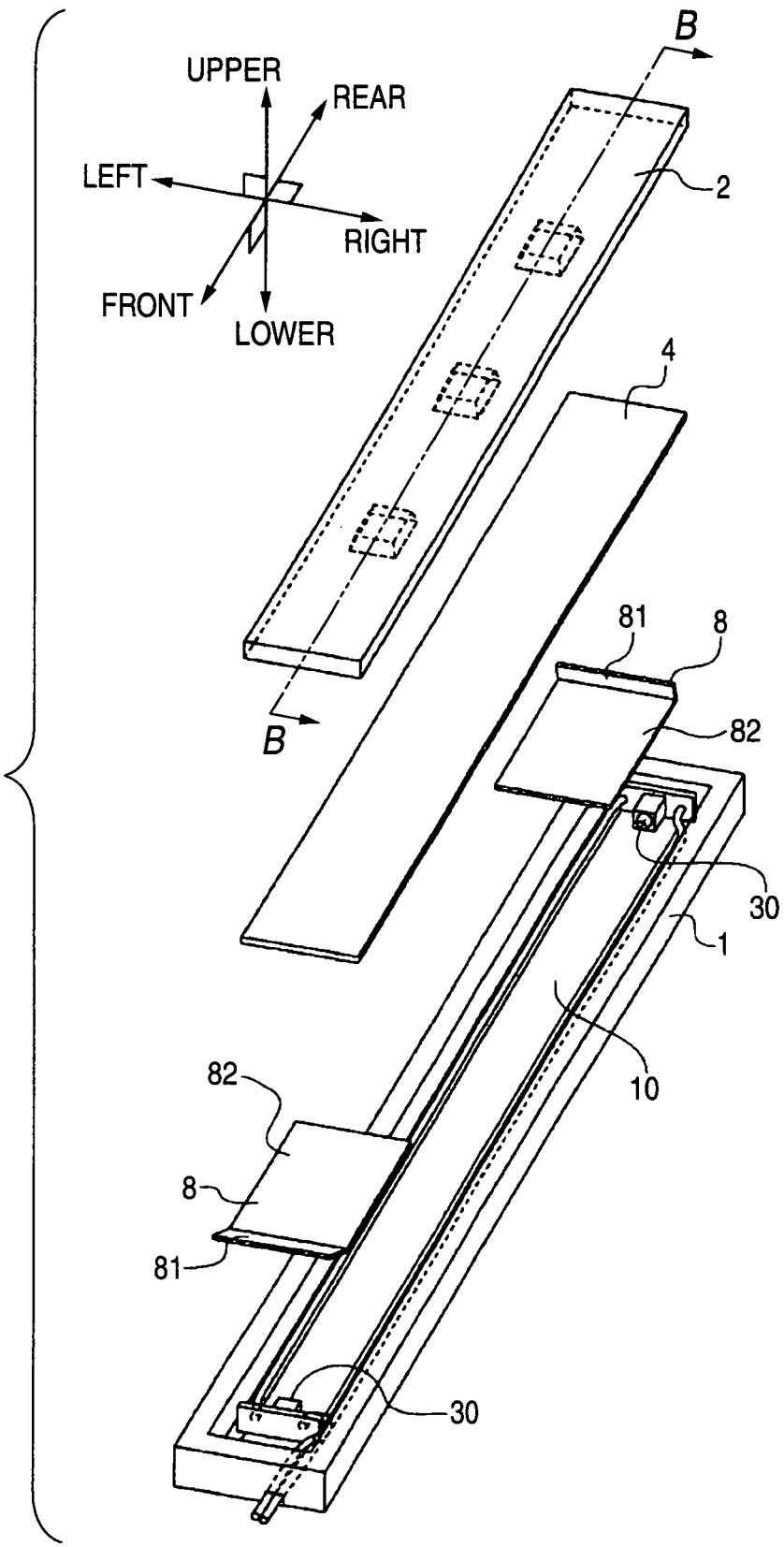
FIG. 7 is an exploded perspective view schematically showing a case, a light guide member, filters and a light source unit used in a fifth embodiment of a scuff plate of the invention.
Figure 8:
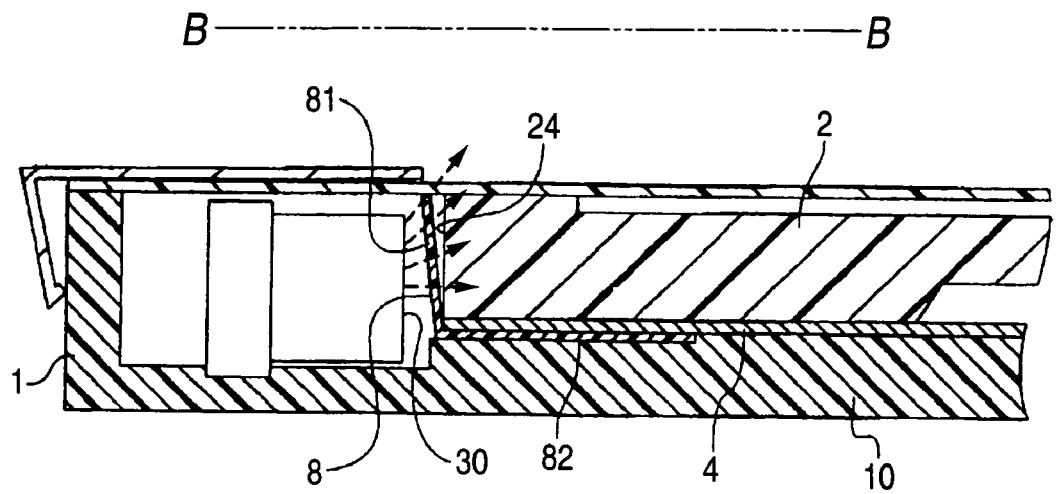
FIG. 8 is a schematic cross-sectional view of the scuff plate of the fifth embodiment taken along the line B-B of FIG. 7.

A scuff plate of a fifth embodiment has the above features (1) and (7). The scuff plate of the fifth embodiment is identical to the scuff plate of the first embodiment except that it is provided with filters. FIG. 7 is an exploded perspective view schematically showing a case, a light guide member and a light source unit of the scuff plate of the fifth embodiment. FIG. 8 is a schematic cross-sectional view of the scuff plate of the fifth embodiment taken along the line B-B of FIG. 7.

The scuff plate of the fifth embodiment includes the filters 8. The filter 8 is made of a mixture (colored material) of a resin and a colorant. This colored material can transmit light emitted from a light source. The filter 8 includes a light-transmitting portion 81, and a fixing portion 82. The fixing portion 82 extends in a direction intersecting the light-transmitting portion 81. Therefore, the filter 8 has a generally L-shape. A thickness of the filter 8 is 0.2 mm, and a length of the fixing portion 82 (i.e., a length in a forward-rearward direction in FIG. 7) is larger than a length of the light-transmitting portion 81 (i.e., a length in the forward-rearward direction in FIG. 7). As shown in FIG. 8, the fixing portion 82 is held between a screen member 4 and a bottom wall 10 of the case 1. The light-transmitting portion 81 is disposed between the light source 30 and a side surface (light-incident side surface 24) of the light guide member 2. The light-transmitting portion 81 is inclined toward the light source 30 such that its distal end is disposed closer to the light source 30 than its proximal end.

In the scuff plate of the fifth embodiment, the light-transmitting portion 81 of the filter 8 is disposed between the light source 30 and the light guide member 2, and therefore light emitted from the light source 30 can be colored by the light-transmitting portion 81. Furthermore, the light-transmitting portion 81 is inclined toward the light source 30, with its distal end disposed closer to the light source 30, and therefore almost all of light emitted from the light source 30 transmits (or passes through) the light-transmitting portion 81. Therefore, the light emitted from the light source 30 can be colored by the light-transmitting portion 81 without causing any color irregularity.

Furthermore, the fixing portion 82 extends in the direction intersecting the light-transmitting portion 81, and therefore the filter 8 is excellent in strength even though it is thin. Therefore, in the scuff plate of the fifth embodiment, a light loss due to the filter 8 is reduced, and besides the excellent productivity is achieved.

Furthermore, the fixing portion 82 is held between the screen member 4 and the bottom wall 10 of the case 1. Therefore, even when the screen member 4 as well as the case 1 is formed into a simple shape, the filter 8 can be fixed in a stable manner.

Furthermore, by holding the fixing portion 82 between the screen member 4 and the bottom wall 10 of the case 1, the positioning of the filter 8 can be easily effected. In this respect, also, the productivity of the scuff plate of the fifth embodiment is excellent.

Therefore, the scuff plate of the fifth embodiment is excellent in design, and also can be produced at a low cost.

Sixth Embodiment

Figure 9:
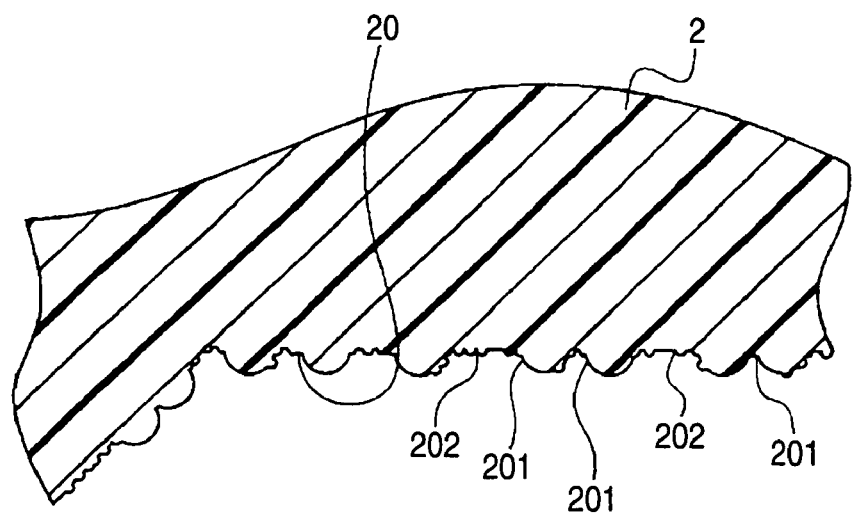
FIG. 9 is an enlarged fragmentary view schematically showing the cross-section of a light guide member used in a sixth embodiment of a scuff plate of the invention.

A scuff plate of a sixth embodiment has the above features (1) and (4). The scuff plate of the sixth embodiment is identical to the scuff plate of the first embodiment except that a light guide member has a different shape. FIG. 9 is an enlarged fragmentary view schematically showing the cross-section of the light guide member of the scuff plate of the sixth embodiment, and FIG. 10 is an enlarged view of an important portion of FIG. 9.

Like the scuff plate of the first embodiment, the scuff plate of the sixth embodiment has luminous recesses 20 each having a depression-shape. The luminous recess 20 of the scuff plate of the sixth embodiment differs from the luminous recess 20 of the scuff plate of the first embodiment in that an inner surface (luminous concave surface) of the luminous recess 20 has an uneven (irregular) shape. Two kinds of concave portions (first concave portions 201 and second concave portions 202) of different maximum depression heights are formed in a distributed (dispersed) manner on the inner surface of the luminous recess 20 such that the inner surface of the luminous recess 20 has the finely uneven (irregular) shape.

The first concave portions 201 and the second concave portions 202 are formed by molding simultaneously when molding the light guide member 2. More specifically, two kinds of (first and second) mold-side concave portions (not shown) of different maximum depression heights are formed on a molding surface for molding the light guide member 2. The first mold-side concave portions are formed by etching. The second mold-side concave portions are formed by sand-blasting. The maximum depression height of the second mold-side concave portions is smaller than the maximum depression height of the first mold-side concave portions. When the light guide member 2 is formed using this mold, a finely uneven shape (having convex portions reversed with respect to the first and second mold-side concave portions) is formed on the inner surface of the luminous recess 20. As shown in FIG. 10, the first convex portions 211 reversed with respect to the first mold-side concave portions, as well as the second convex portions 212 reversed with respect to the second mold-side concave portions, are formed on the inner surface of the luminous recess 20. Concave portions of a larger maximum depression height are formed between the adjacent first convex portions 211 and also between the adjacent first and second convex portion 211 and 212. These concave portions define the first concave portions 201, respectively. Also, there are provided concave portions of a smaller maximum depression height each formed between the adjacent second convex portions 212. These concave portions define the second concave portions 202, respectively. Further, in the case where the second mold-side concave portion is formed on the first mold-side concave portion in the mold for molding the light guide member 2, a concave portion of a smaller maximum depression height is also formed between the corresponding first convex portion 211 and the corresponding second convex portion 212. This concave portion also defines the second concave portion 202.

Figure 10:
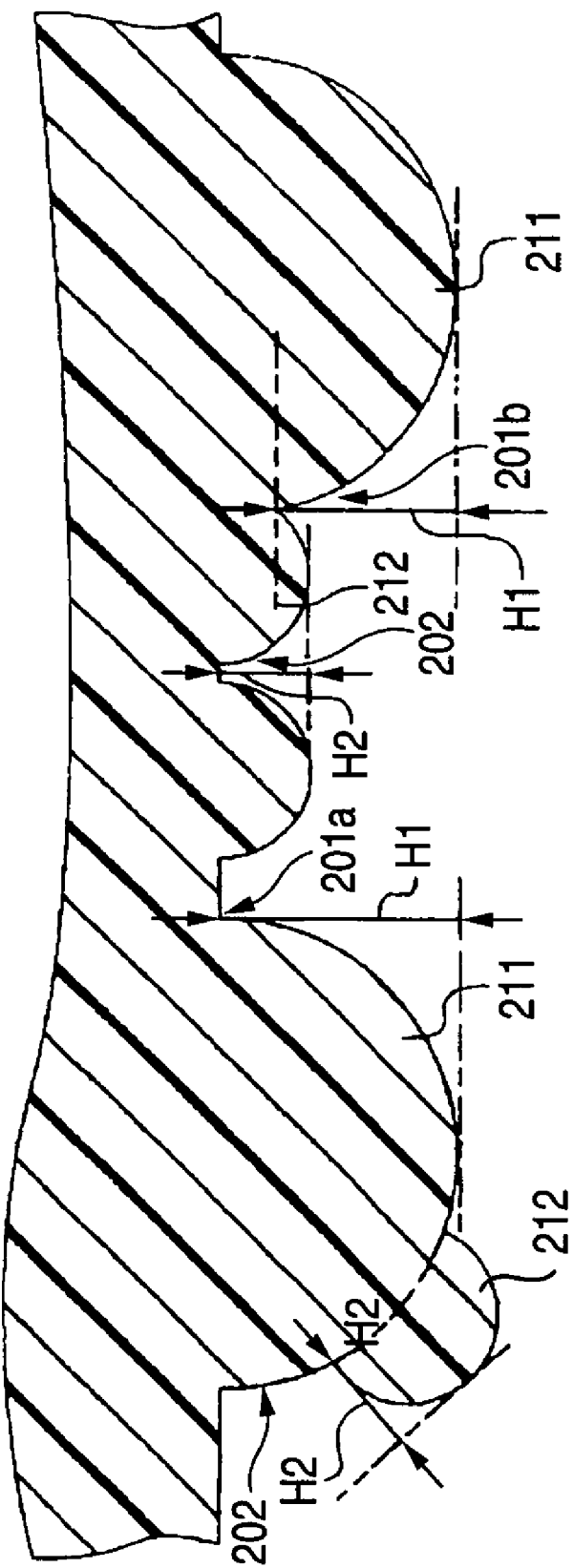
FIG. 10 is an enlarged view of an important portion of FIG. 9.

Here, the maximum depression height means a maximum value of the depression height of the first concave portion 201 (or the second concave portion 202), and varies depending on the position of the first convex portion 211 and the position of the second convex portion 212, as shown in FIG. 10. For example, the maximum depression height H1 of the first concave portion 201*a* formed between the first convex portion 211 and the second convex portion 212 (which are disposed adjacent to each other in spaced relation) is the distance between the inner surface of the luminous recess 20 (assuming that the first and second convex portions 211 and 212 are not formed) and the apex of the first convex portion 211. Also, the maximum depression height H1 of the first concave portion 201b formed between the first convex portion 211 and the second convex portion 212 (which are disposed adjacent to each other in overlapping relation) is the distance from the boundary between the first and second convex portions 211 and 212 to the apex of the first convex portion 211. The same is true with the maximum depression height H2 of the second concave portions 202. The maximum depression height H2 of the second concave portion 202 is smaller than the maximum depression height H1 of the first concave portion 201. Incidentally, the maximum depression height H1 of the first concave portion 201 as well as the maximum depression height H2 of the second concave portion 202 is smaller than the maximum depression height of the luminous recess 20 (assuming that the first and second concave portions 201 and 202 are not formed).

In the scuff plate of the sixth embodiment, the maximum depression height H1 of the first concave portion 201 is about 20 μm, and the maximum depression height H2 of the second concave portion 202 is about 4 μm. For reference, the maximum depression height of the luminous recess 20 is 1.0 mm.

In the scuff plate of the sixth embodiment, the plurality of first concave portions 201 and the plurality of second concave portions 202 are formed in a distributed manner on the inner surface of the luminous recess 20 such that this inner surface has the uneven (irregular) shape, and therefore the luminous concave surface can be shined bright uniformly. Furthermore, the maximum depression height H1 of the first concave portions 201 is larger than the maximum depression height H2 of the second concave portions 202, and therefore light-receiving portions are increased in size, so that the luminous concave surface can be shined brighter. Furthermore, since the maximum depression height H2 of the second concave portions 202 is smaller than the maximum depression height H1 of the first concave portions 201, the luminous concave surface can be shined more uniformly. Therefore, the scuff plate of the sixth embodiment is excellent in design.

Incidentally, the first concave portions 201 and the second concave portions 202 can have any suitable shape such as a hole-shape and a groove-shape in so far as these concave portions have the depression-shape. In the scuff plate of the sixth embodiment, although the first concave portions 201 and the second concave portions 202 are formed by the molding, the method of forming the first and second concave portions 201 and 202 is not particularly limited to such molding method. For example, the concave portions may be formed directly on the molded light guide member 2 by sandblasting, laser etching or other means.

Although the scuff plate of the sixth embodiment have two kinds of concave portions (the first concave portions 201 and the second concave portions 202) of different maximum depression heights, the scuff plate of the invention may have three or more kinds of concave portions of different maximum depression heights.

The second concave portions 202 need to be smaller in maximum depression height than the first concave portions 201, and preferably the maximum depression height of the first concave portions 201 is 10 to 50 μm, while the maximum depression height of the second concave portions 202 is 0.5 to 10 μm.

Seventh Embodiment

Figure 11:
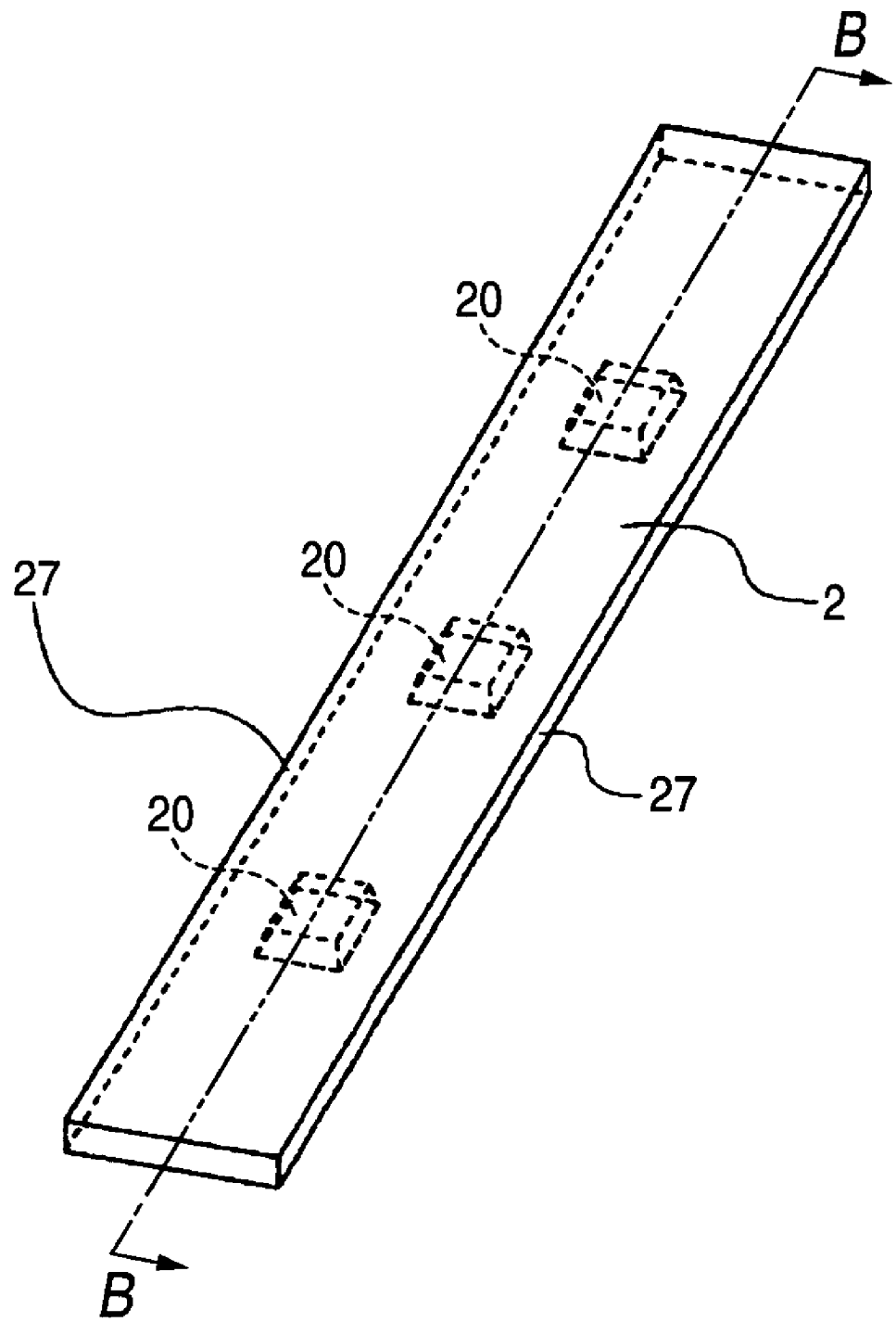
FIG. 11 is a perspective view schematically showing a light guide member used in a seventh embodiment of a scuff plate of the invention.
Figure 12:
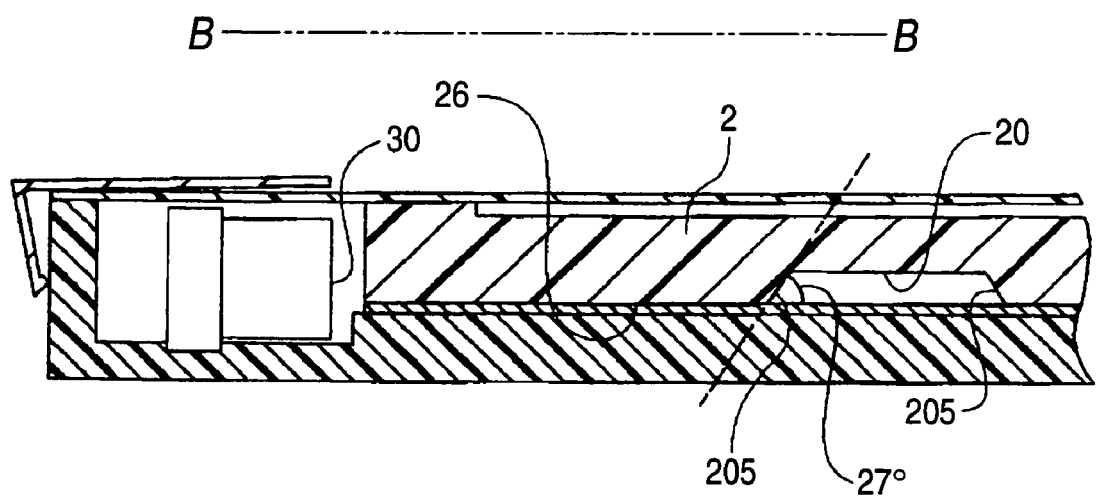
FIG. 12 is a cross-sectional view of the scuff plate of the seventh embodiment taken along the line B-B of FIG. 11.

A scuff plate of a seventh embodiment has the above features (1) and (4) to (6) The scuff plate of the seventh embodiment is identical to the scuff plate of the sixth embodiment except that a light guide member has a different shape. FIG. 11 is a perspective view schematically showing the light guide member of the scuff plate of the seventh embodiment, and FIG. 12 is a cross-sectional view of the scuff plate of the seventh embodiment taken along the line B-B of FIG. 11.

The light guide member 2 of the seventh embodiment has luminous recesses 20 similar to the luminous recesses of the light guide member of the sixth embodiment. As in the scuff plate of the sixth embodiment, first concave portions (not shown) and second concave portions (not shown) are formed in a distributed manner on an inner surface of the luminous recess 20 such that this inner surface has a finely uneven (irregular) shape. Each of those portions (light source-side portions 205 in FIG. 12) of the inner surface of the luminous recess 20 disposed closer to respective light sources 30 is inclined at an angle of 27° relative to a bottom surface 26 of the light guide member 2.

In the scuff plate of the seventh embodiment, first concave portions (not shown) and second concave portions (not shown) are also formed in a distributed manner on those portions (luminous side surfaces 27) of a side (peripheral) surface of the light guide member 2 other than those portions thereof facing the respective light sources 30 such that each of these luminous side surfaces 27 has a finely uneven (irregular) shape. A maximum depression height of the first concave portions formed on the luminous recess 20 is generally equal to a maximum depression height of the first concave portions formed on the luminous side surface 27. Also, a maximum depression height of the second concave portions formed on the luminous recess 20 is generally equal to a maximum depression height of the second concave portions formed on the luminous side surface 27.

In the scuff plate of the seventh embodiment, the luminous side surfaces 27 have the uneven (irregular) shape, and therefore the imaging of a design (displayed by the luminous recess 20) on the luminous side surfaces 27 is suppressed. Therefore, the scuff plate of the seventh embodiment is excellent in design. Furthermore, the first concave portions and the second concave portions are formed in a distributed manner on each of the luminous side surfaces 27 such that these luminous side surfaces 27 have the uneven shape, and therefore light emitted from the light source 30 and then reaching each luminous side surface 27 can be reflected in a larger proportion toward the inside of the light guide member 2. Therefore, a light loss due to the luminous side surfaces 27 can be suppressed, and the inner surface of each luminous recess 20 can be shined bright.

Furthermore, each light source-side portion 205 is inclined at an angle of 27° relative to the bottom surface of the light guide member 2, and therefore the light-receiving portions on the inner surface of the luminous recess 20 are increased in size. This compensates for a light loss due to the luminous side surfaces 27, and the luminous recess 20 can be shined bright.

What is claimed is:

1. A scuff plate, comprising:
  a box-like case;
  a light guide member, made of a transparent material, having a luminous surface of a concave-convex shape and housed within said case;
  a light source, applying light to a side surface of said light guide member;
  a screen member, made of a non-transparent material and disposed between said light guide member and a bottom wall of said case;
  a wire harness, electrically connecting said light source to a power source, at least part of said wire harness being disposed between said screen member and said bottom wall of said case; and a filter made of a colored material which can transmit light emitted from said light source is, wherein a portion of said filter serving as a light-transmitting portion is disposed between said light source and the side surface of said light guide member, and another portion of said filter serving as a fixing portion extends in a direction intersecting said light-transmitting portion, and is held between said screen member and the bottom wall of said case.

2. The scuff plate according to claim 1, wherein said screen member is made of metal.

3. The scuff plate according to claim 2, wherein:

an inward portion of an obverse surface of said light guide member disposed inwardly of an outer peripheral portion thereof is depressed with respect to said outer peripheral portion such that said obverse surface assumes a picture frame-like shape; and said protective member is held against said outer peripheral portion of said obverse surface of said light guide member.

4. The scuff plate according to claim 1, wherein:

said light guide member has a luminous recess of a depression-shape;

at least part of said luminous surface is defined by an inner surface of said luminous recess; and a plurality of first concave portions of a depression-shape and a plurality of second concave portions of a depression-shape which are smaller in maximum depression height than said first concave portions are formed in a distributed manner on the inner surface of said luminous recess such that said inner surface of said luminous recess has an uneven shape.

5. The scuff plate according to claim 1, wherein:

said light guide member has a luminous recess of a depression-shape;

at least part of said luminous surface is defined by an inner surface of said luminous recess; and a plurality of first concave portions of a depression-shape and a plurality of second concave portions of a depression-shape which are smaller in maximum depression height than said first concave portions are formed in a distributed manner on those portions of a side surface of said light guide member other than that portion thereof facing said light source such that said portions of said side surface other than said portion thereof facing said light source has an uneven shape.

6. The scuff plate according to claim 5, wherein a portion of the inner surface of said luminous recess disposed closer to said light source is inclined at an angle of not smaller than 25° relative to a bottom surface of said light guide member.

7. The scuff plate according to claim 1, wherein the resin is polycarbonate resin.

8. The scuff plate according to claim 1, wherein the light source includes an LED.

9. A scuff plate, comprising:

a box-like case having a bottom wall;

a light guide member, wherein the light guide member is made of a transparent material, the light guide member is located in the case, the light guide member has a generally plate-like shape including first and second main surfaces, which are opposite to one another, and edge surfaces, which extend between the first and second main surfaces, the first main surface faces outward from the case, and the second main surface faces the bottom wall, and the second main surface includes a luminous surface, and the luminous surface has a concave-convex shape; and a light source, which is located adjacent to one of the edge surfaces of the light guide member, wherein the light source applies light to the edge surface in a direction that is generally parallel to the first and second main surfaces of the light guide member;

a screen member that is made of a non-transparent material, wherein the screen member is located between the light guide member and the bottom wall;

a wire harness that electrically connects the light source to a power source, wherein the wire harness is located between the screen member and the bottom wall of the case; and a filter made of a colored material, wherein the colored material can transmit light emitted from said light source, a portion of the filter, which serves as a light-transmitting portion, is located between the light source and the edge surface, and another portion of the filter, which serves as a fixing portion, extends in a direction intersecting the light-transmitting portion and is sandwiched between the screen member and the bottom wall.

10. The scuff plate according to claim 9, wherein said screen member is made of metal.

11. The scuff plate according to claim 10, wherein:

an inward portion of the first main surface of said light guide member disposed inwardly of an outer peripheral portion thereof is depressed with respect to said outer peripheral portion such that said first main surface assumes a picture frame-like shape; and said protective member is held against said outer peripheral portion of said first main surface of said light guide member.

12. The scuff plate according to claim 9, wherein:

said light guide member has a luminous recess of a depression-shape;

at least part of said luminous surface is defined by an inner surface of said luminous recess; and a plurality of first concave portions of a depression-shape and a plurality of second concave portions of a depression-shape which are smaller in maximum depression height than said first concave portions are formed in a distributed manner on the inner surface of said luminous recess such that said inner surface of said luminous recess has an uneven shape.

13. The scuff plate according to claim 9, wherein:

said light guide member has a luminous recess of a depression-shape;

at least part of said luminous surface is defined by an inner surface of said luminous recess; and a plurality of first concave portions of a depression-shape and a plurality of second concave portions of a depression-shape which are smaller in maximum depression height than said first concave portions are formed in a distributed manner on those portions of a side surface of said light guide member other than that portion thereof facing said light source such that said portions of said side surface other than said portion thereof facing said light source has an uneven shape.

14. The scuff plate according to claim 13, wherein a portion of the inner surface of said luminous recess disposed closer to said light source is inclined at an angle of not smaller than 25° relative to a bottom surface of said light guide member.

15. The scuff plate according to claim 9, wherein the resin is polycarbonate resin.

16. The scuff plate according to claim 9, wherein the light source includes an LED.

* * * * *